United States Patent
Lee et al.

(10) Patent No.: US 7,847,699 B2
(45) Date of Patent: Dec. 7, 2010

(54) APPARATUS AND METHOD OF UBIQUITOUS CONTEXT-AWARE AGENT BASED ON SENSOR NETWORKS

(75) Inventors: Hyun-Jeong Lee, Daejeon (KR); Shin-Young Lim, Daejeon (KR); Jae-Doo Huh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 373 days.

(21) Appl. No.: 12/085,315

(22) PCT Filed: Oct. 16, 2006

(86) PCT No.: PCT/KR2006/004186

§ 371 (c)(1),
(2), (4) Date: May 21, 2008

(87) PCT Pub. No.: WO2007/066887

PCT Pub. Date: Jun. 14, 2007

(65) Prior Publication Data

US 2009/0261978 A1     Oct. 22, 2009

(30) Foreign Application Priority Data

Dec. 6, 2005    (KR)    ........................ 10-2005-0118422

(51) Int. Cl.
*G08B 23/00*    (2006.01)
(52) U.S. Cl. ............... 340/573.1; 340/505; 340/286.02; 706/46
(58) Field of Classification Search .............. 340/573.1, 340/505, 517, 521, 522, 531, 3.3, 286.02; 707/705; 709/203, 226; 706/46, 47
See application file for complete search history.

(56) References Cited

U.S. PATENT DOCUMENTS

| 5,555,376 | A | 9/1996 | Theimer et al. |
| 7,725,532 | B2 * | 5/2010 | Jeon et al. .................... 709/203 |
| 7,734,780 | B2 * | 6/2010 | Abbott et al. ............... 709/225 |
| 7,739,607 | B2 * | 6/2010 | Abbott et al. ............... 715/744 |
| 2006/0020633 | A1 | 1/2006 | Cho |

FOREIGN PATENT DOCUMENTS

KR    2002-0050780    6/2002

OTHER PUBLICATIONS

International Search Report mailed Jan. 23, 2007 in connection with the International application PCT/KR2006/004186.

* cited by examiner

*Primary Examiner*—Toan N Pham
(74) *Attorney, Agent, or Firm*—Staas & Halsey LLP (57) ABSTRACT

An apparatus and method for context awareness by detecting intentions of a user in the ubiquitous environment using context information which is created by analyzing real world data collected from sensors are provided. The apparatus is configured of a sensor platform, a context-aware agent and a service provider. The sensor platform collects data of real world and transmits the collected data to the context-aware agent. The context-aware agent integrates the data of real world from the sensor platform, and stores and manages context information according to the integrated data. The service provider automatically controls objects to perform necessary operations to provide a predetermined intelligent services according to the context information received from the context-aware agent.

17 Claims, 8 Drawing Sheets

| | [0] MESSAGE IDENTIFICATION (501) | [1] MESSAGE TYPE (502) | [2] OBJECT IDENTIFICATION (503) | [3] VOLTAGE (504) | [4] TEMPERATURE (505) | [5] LUMINANCE (506) | [6] NOISE (507) | [7] ACCELERATION X (508) | [8] ACCELERATION Y (509) | [9] ELECTROMAGNETIC X (510) | [10] ELECTROMAGNETIC Y (511) | [11] TIME (512) |
|---|---|---|---|---|---|---|---|---|---|---|---|---|
| [0] | MsgId 1 | Type | ID | Vref | Therm | light | mic | accelX | accelY | magX | magY | Time |
| [1] | MsgId 2 | Type | ID | Vref | Therm | light | mic | accelX | accelY | magX | magY | Time |
| .. | .. | .. | .. | .. | .. | .. | .. | .. | .. | .. | .. | .. |
| [n−1] | MsgId n | Type | ID | Vref | Therm | light | mic | accelX | accelY | magX | magY | Time |

FIG. 5

| | [1]<br>MESSAGE<br>TYPE<br>(602) | [2]<br>OBJECT<br>IDENTIFI-<br>CATION<br>(603) | [3]<br>X COORDI-<br>NATE<br>(604) | [4]<br>Y COORDI-<br>NATE<br>(605) | [5]<br>Z COORDI-<br>NATE<br>(606) | [6]<br>VIEWABLE<br>ANGLE<br>(607) | [7]<br>TIME<br>(608) |
|---|---|---|---|---|---|---|---|
| [0] MsgId 1 | Type | ID | X COORDINATE | Y COORDINATE | Z COORDINATE | VIEWABLE ANGLE | TIME |
| [1] MsgId 2 | Type | ID | X COORDINATE | Y COORDINATE | Z COORDINATE | VIEWABLE ANGLE | TIME |
| .. | .. | .. | .. | .. | .. | .. | .. |
| [n−1] MsgId n | Type | ID | X COORDINATE | Y COORDINATE | Z COORDINATE | VIEWABLE ANGLE | TIME |

[0] MESSAGE IDENTIFICATION (601)

FIG. 6

| | [0] MESSAGE IDENTIFI- CATION (701) | [1] MESSAGE TYPE (702) | [2] QUANTITATIVE OPERATOR (703) | [3] MOVING OBJECT IDENTIFICATION (704) | [4] STATIC OBJECT IDENTIFICATION (705) | [5] TIME (706) |
|---|---|---|---|---|---|---|
| [0] | MsgId 1 | Type | approach/ reside/leave | Dynamic ObjId | Static ObjId | TIME |
| [1] | MsgId 2 | Type | approach/ reside/leave | Dynamic ObjId | Static ObjId | TIME |
| .. | .. | .. | .. | .. | .. | .. |
| [n-1] | MsgId n | Type | approach/ reside/leave | Dynamic ObjId | Static ObjId | TIME |

FIG. 7

| | [0] MESSAGE IDENTIFICATION (801) | [1] MESSAGE TYPE (802) | [2] RELATION OPERATOR (803) | [3] MOVING OBJECT IDENTIFICATION (804) | [4] STATIC OBJECT IDENTIFICATION (805) | [5] START TIME (806) | [6] END TIME (807) |
|---|---|---|---|---|---|---|---|
| [0] | MsgId 1 | Type | on/front/rear /left/right | Dynamic ObjId | Static ObjId | Start time | End time |
| [1] | MsgId 2 | Type | on/front/rear /left/right | Dynamic ObjId | Static ObjId | Start time | End time |
| .. | .. | .. | .. | .. | .. | .. | .. |
| n-1 | MsgId n | Type | on/front/rear /left/right | Dynamic ObjId | Static ObjId | Start time | End time |

APPARATUS AND METHOD OF UBIQUITOUS CONTEXT-AWARE AGENT BASED ON SENSOR NETWORKS

CROSS REFERENCE TO RELATED APPLICATIONS

This application claims the benefit under 35 U.S.C. Section 371, of PCT International Application Number PCT/KR2006/004186, filed Oct. 16, 2006 and Korean Application No. 10-2005-0118422 filed Dec. 6, 2005 in Korea, the contents of all of which are incorporated herein by reference.

TECHNICAL FIELD

The present invention relates to a sensor network in a ubiquitous environment, and more particularly, to an apparatus and method for context awareness by detecting intentions of a user in the ubiquitous environment using context information which is created by analyzing real world data collected from sensors.

BACKGROUND ART

In a ubiquitous environment, all objects (e.g., homes, offices, buildings, telematics and artificial intelligent robots) are connected together through a communication network, and each of the objects performs dedicated functions by exchanging information about a target object to provide a context-aware service for the target object. Generally, a ubiquitous service denotes all of services provided in the ubiquitous environment.

In the information technology (IT) generation, a human learns a computing technology to use available objects such as computers, electric appliances and communication devices. That is, the computing technology is a simple tool that improves productivity. Moreover, a computing technology in the ubiquitous generation learns a human to intelligently provide the related services according to context of the users.

Such a ubiquitous service must be provided based on context of a user, which is analyzed and detected by a high intelligent level of context-aware technology. If not, the ubiquitous service becomes a harmful technology giving inconvenience to the human although a user is in the ubiquitous environment that is configured of objects having a superior computing power and allows the user to access the computer anytime and anywhere. That is, the ubiquitous environment must provide high intelligent aware-service by understanding users' intentions and detecting users' context. Such an environment providing high intelligent aware-service is called as a ubiquitous intelligence.

There are three essential technologies required to embody the ubiquitous intelligence.

The first essential technology is a sensing information based context aware/decision technology. The sensing information based context aware/decision technology analyzes sensed information about objects around a user, determines whether the sensed information is related to the users' intention based on the analysis result and generates event signals in response to a service request.

The second technology is an autonomic computing technology. The automatic computing technology enables computers to automatically manage themselves in order to minimize participants of user.

The third technology is a self-growing engine that enables the ubiquitous environment to be automatically evolved by self-learning and growing.

Among the essential technologies, the context aware/decision technology was spotlighted as the most important technology for the ubiquitous intelligence environment.

Conventionally, the context aware/decision technology was mostly developed to provide a simple service based on limited context processing, for example, a positioning based service to a cellular phone user in a wireless environment or a user in vehicle in a mobile environment. That is, a context aware/decision technology was not developed for the ubiquitous intelligence environment.

Since a proper context aware/decision technology is not applied to the ubiquitous environment, a ubiquitous service may be provided based on insufficient, incorrect and inaccurate users' environment, context and intention. Therefore, the ubiquitous service may become a harmful service giving inconvenience to the user.

DISCLOSURE OF INVENTION

Technical Problem

Accordingly, the present invention is directed to an apparatus and method of a ubiquitous context-aware agent based on sensor networks that substantially obviates one or more problems due to limitations and disadvantages of the related art.

An object of the present invention is to provide an apparatus of a ubiquitous context-aware agent based on sensor networks and a method thereof for automatically providing a service according to users' context and intention through creating context data by analyzing and integrating real world data collected from sensors, storing and managing the created context data in a context storage, inferring users' intentions based on the context data and providing the service according to the context data and the intention of the user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, an apparatus of a ubiquitous context-aware agent based on a sensor network, the apparatus includes:

a sensor platform for collecting data of real world and transmitting the collected data to a context-aware agent;

the context-aware agent for interpreting and integrating the data of real world from the sensor platform, and storing and managing context information according to the interpreted and integrated data; and a service provider for receiving the context information from the context-aware agent, and automatically performing operations according to the received context information, wherein the context-aware agent includes a context interpreter for receiving the collected data from the sensor platform and interpreting the received data to be viewable to a human and a computer; an integrator for receiving the interpreted context information from the context interpreter and integrating the received context information in a predetermined format; a space manager for receiving the interpreted context information from the context interpreter and detecting users' intention with reference to a relation between the users' movement and static objects in a predetermined space; a home map manager for receiving the interpreted context information from the context interpreter, and displaying current states of a real world to the user using the interpreted context information; a context storage for storing information transferred from the context integrator, the space manager and the home map manager, and outputting the stored information in response to the request; and a context manager for receiving the predetermined format of the integrated context information from the context integrator and managing the context information stored in the context storage.

According to an aspect of the present invention, there is provided a method of context-awareness using a ubiquitous context-aware agent based on a sensor network including: a) detecting sensing-data related to a real world collected through a sensor platform, and transforming the sensing-data to context information by analyzing a meaning of the sensing-data; b) determining whether a value of the transformed context information is in a normal range or not if the type of the transformed context information is an environmental context; c) setting an urgent flag, storing corresponding context information and transferring the context information to a service provider if the value of the transformed context information is not in the normal range; d) integrating context information, storing corresponding context information, filtering the stored context information and transmitting the filtered context information to a service provider if the value of the transformed context information is in the normal range; e) analyzing a relation between a moving object and a static object if the type of the transformed context information is a position context, detecting an intentions of a user according to a position, and determining whether it's value is in a normal range or not; and f) integrating context information, storing corresponding context information, filtering the stored context information and providing the filtered context information to a service provider if the value is in the normal range.

According to another aspect of the present invention, there is provided a method of inferring a position context in a context-aware method using a ubiquitous context-aware agent based on a sensor network, including: a) determining a type of an object through monitoring context information in real time, and creating an object model and an object area model if the type of the object is a static object; b) detecting a qualitative state if the type of the object is a moving object in the operation a) or if the object model and the object area model are created in the operation a); c) generating a qualitative state message based on the detected qualitative state and storing the generated qualitative state message; d) generating an object relation message by inferring an object relation using the qualitative state message and storing the generated object relation message; and e) generating a semantic model using the stored object relation model, generating a semantic model message according to the generated semantic model and storing the semantic model message.

The present invention relates to a method of context-awareness by creating context data through analyzing various data such as voltage, temperature, humidity, noise, acceleration, electromagnetic field and computing power which are collected from sensors, integrating the created context data in a predetermined format, and detecting users' contexts and inferring users' intentions based on the position in the ubiquitous environment using the context data.

It is to be understood that both the foregoing general description and the following detailed description of the present invention are exemplary and explanatory and are intended to provide further explanation of the invention as claimed.

Advantageous Effects

The apparatus and method for ubiquitous context-aware based on a sensor network allows the real-time service according to the object and the context thereof by analyzing and integrating real world data collected from the sensors.

Furthermore, the apparatus and method for ubiquitous context-awareness based on the sensor network allows a computer program to provide a context-aware service according to the users' intention and context by expressing the position and the direction information collected from the sensor in real time as the semantic context in a terminological logic format through hierarchical inference.

It will be apparent to those skilled in the art that various modifications and variations can be made in the present invention. Thus, it is intended that the present invention covers the modifications and variations of this invention provided they come within the scope of the appended claims and their equivalents.

BRIEF DESCRIPTION OF THE DRAWINGS

The accompanying drawings, which are included to provide a further understanding of the invention and are incorporated in and constitute a part of this application, illustrate embodiment of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings.

Figure 1:
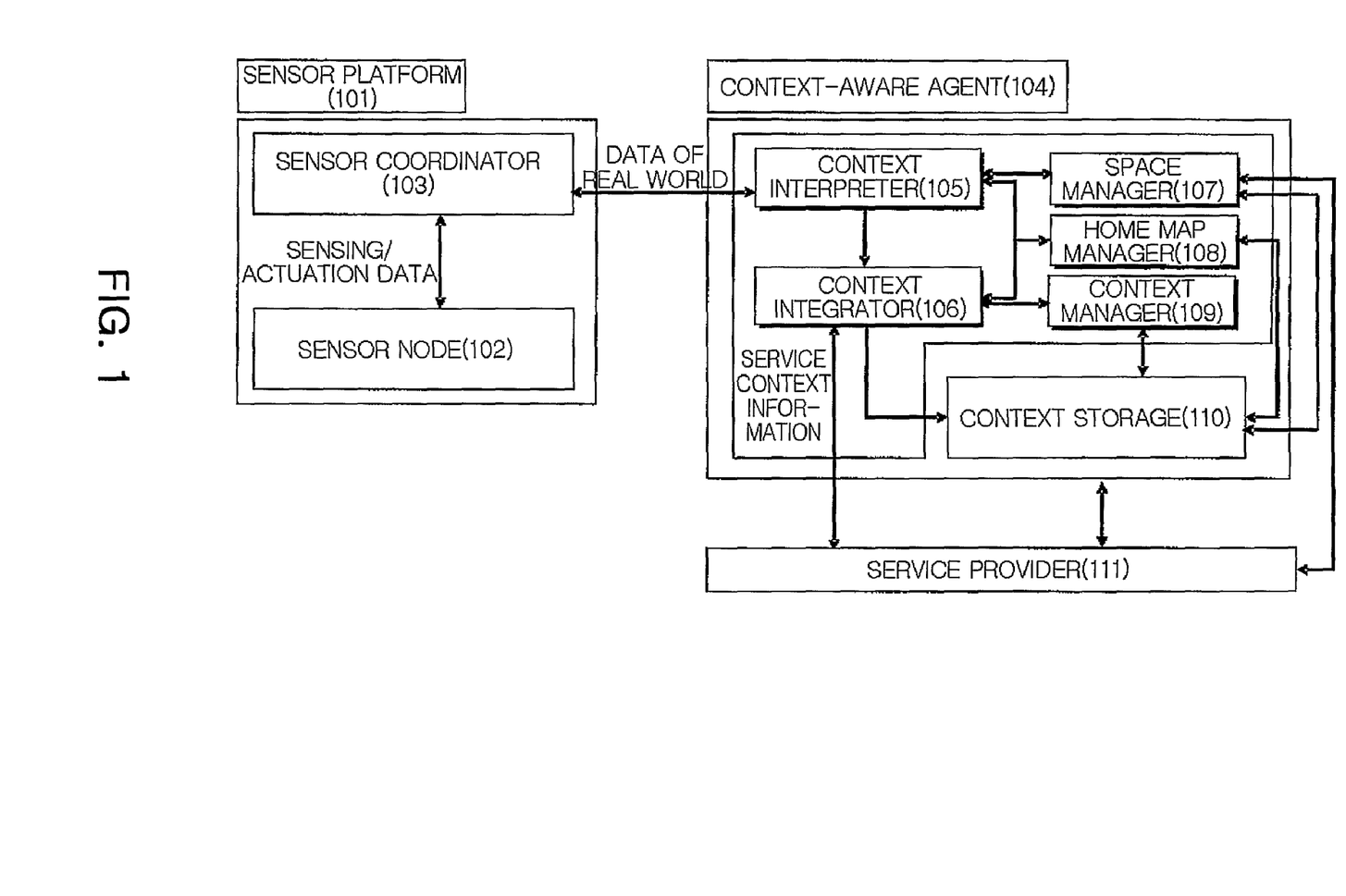
FIG. 1 is a block diagram illustrating an apparatus of a ubiquitous context-aware agent based on a sensor network according to an embodiment of the present invention.

FIG. 1 is a block diagram illustrating an apparatus of a ubiquitous context-aware agent based on a sensor network according to an embodiment of the present invention.

Referring to FIG. 1, the apparatus of ubiquitous context-aware agent includes: a sensor platform 101 for collecting data of real world and transmitting the collected data to a context-aware agent 104; a context-aware agent 104 for analyzing and integrating the collected data from the sensor platform 101, storing context data according to the analyzed and integrated data and managing the stored context data; and a service provider 111 for receiving the service context information from the context-aware agent 104 and controlling objects to perform necessary operations to provide a predetermine service according to the received service context information.

The sensor platform 101 includes a sensor node 102 for collecting real world data, and a sensor coordinator 103 for transmitting the collected data to the context-aware agent 104. Herein, the sensor node 102 may be configured in various forms to collect the real world data.

The context-aware agent 104 includes: a context interpreter 105 for receiving real world data from the sensor coordinator 103 and interpreting the received data to be recognizable by a human and a computer; a context integrator 106 for receiving the interpreted context data and integrating the received data to a predetermined format; a space manager 107 for receiving the interpreted context data from the context interpreter and inferring an intention of a user by analyzing a relationship of the movement of the user and static objects in a predetermined space; a home mapping manager 108 for receiving the analyzed context data from the context interpreter 105 and displaying states of real world for a user using the analyzed context data; a context storage 110 for storing information from the context integrator 106, the space manager 107 and the home map manager 108 and outputting information in response to a request; and a context manager 109 for receiving the integrated context data in a predetermined format from the context integrator 106 and managing the stored information in the context storage 110.

The context integrator 106 also transfers information about a service state to a service provider 111. That is, the context integrator 106 transfers a context requiring a predetermined service among the integrated contexts to the service provider 111 in order to automatically provide a predetermined service.

As described above, the space manager 107 infers the users' intention based on the analyzed relationship between the users' movement and the static objects in the predetermined space. For example, if a user walks to a switch of light in a dark room, the space manager 107 recognizes the users' intention to turn the light based on the analyzing the relationship between the users' movement and the static object which is the switch of light.

The home map manager 108 displays the ubiquitous space such as a digital home, an office, a building or a telemetric, and adds, deletes or updates objects in the ubiquitous space according to the context, dynamically.

The service provider 111 receives information about a context requiring the predetermined service from the context integrator 106, understands the intention of the user through analyzing the relationship between the received and analyzed context about users' movement and the static object, and automatically provides the predetermined service based on the inferred users' intention.

Figure 2:
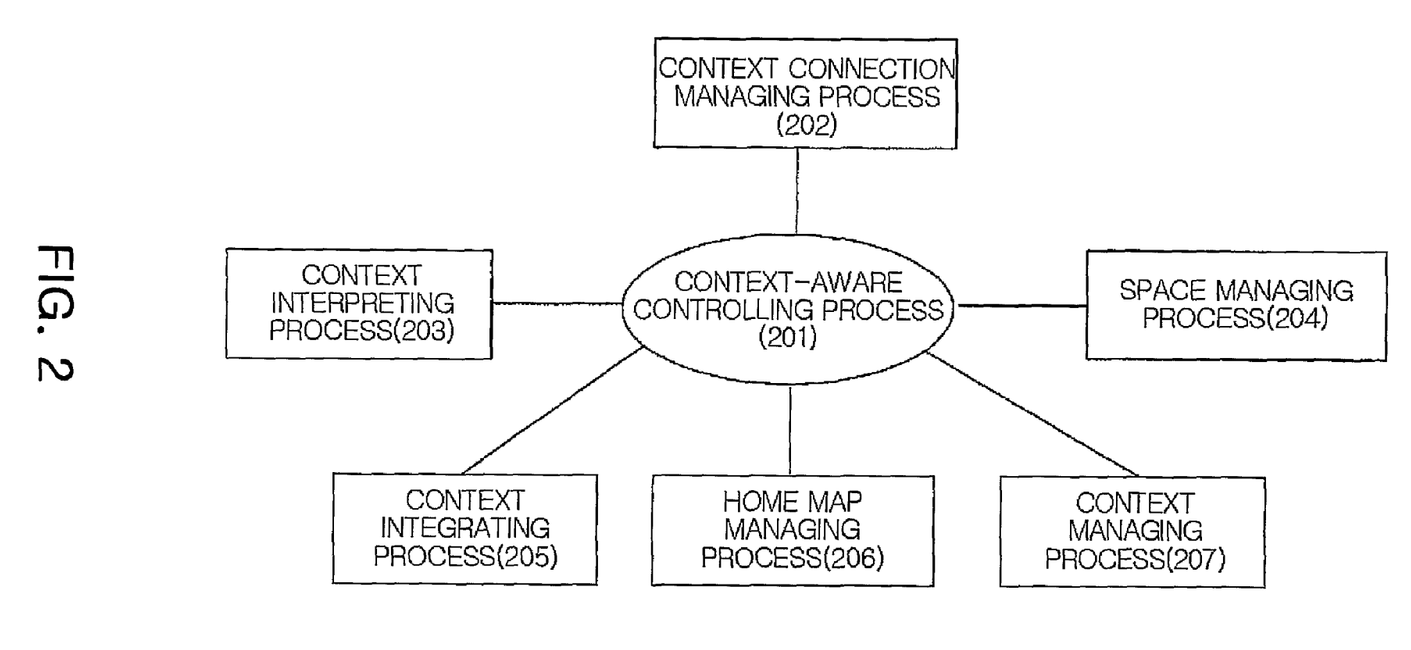
FIG. 2 is a block diagram showing a software configuration of a ubiquitous context-aware agent based on a sensor network according to an embodiment of the present invention.

FIG. 2 is a block diagram showing a software configuration for a ubiquitous context-aware agent based on a sensor network according to an embodiment of the present invention.

Herein, blocks of the software configuration for the ubiquitous context-aware agent shown in FIG. 2 may be embodied as hardware blocks of a ubiquitous context-aware agent.

Referring to FIG. 2, the software configuration of the ubiquitous context-aware agent is correspondent to the context-aware agent shown in FIG. 1. That is, the software configuration of the ubiquitous context-aware agent according to the present invention includes a context interpreting process 203 as the context interpreter 105, a space managing process 204 as the space manager 107, a home map managing process 206 as the home map manager 108, a context managing process 207 for the context manager 109 and a context integrating process 205 for the context integrator 106. The software configuration of the ubiquitous context-aware agent further includes a context-aware connection managing process 202 for storing information about connections to external devices and an agent control process 201 for generally controlling the entire software configuration.

The context-aware agent control process 201 observes messages received from a sensor platform 101 and a service providing unit 111 connected through the context-aware connection managing process 202 performs operations based on the observing result.

The messages from the sensor platform 101 to the context-aware agent control process 201 include environment data and position data. The context interpreting process 203 interprets the environment data to be viewable to a human and a computer, creates context data based on the interpreting result and transmits the created context data with an urgent flag to the service provider 111 through the connection managing process 202 if the interpreted data exceeds a normal range. As a result, a predetermined service is automatically provided to a user.

If the context-aware agent controlling process 201 receives the position data from the sensor platform 101, the context-aware agent controlling process 201 extracts three-dimensional coordinates (X, Y, Z) of an moving object by analyzing the meaning of the position data, analyzing a relationship between the moving object and previously-stored information of static objects, and transmits the analyzed relationship to the space managing process 204 to infer the intention of the moving object based on the analyzed relationship.

The space managing process 204 detects a comparative state of the static object and the moving object based on the position data and the direction data transferred from the context-aware agent controlling process 201, defines a position relation between the static object and the moving object based on a time, and infers the intention of the moving object's movement using rules made based on the characteristics of the static object.

The context integrating process 205 integrates the interpreted contexts from the context-aware agent controlling process 201 to the predetermined format data. The integrated data is transmitted to the home map managing process 206 to display the integrated data through the context-aware agent controlling process 201. Also, the integrated data is transferred to the context managing process 207 to store the integrated data in the context storage 110 through the context-aware controlling process 201.

The message transmitted from the service provider 111 to the context-aware agent controlling process 201 is a response to the urgent message transmitted by the context-aware agent 104 or messages requiring a predetermined service. If the response message is not normal, a previously-transmitted message is retransmitted to retry performing of automated service.

In the software configuration according to the present embodiment shown in FIG. 2, each of the processes denotes a logical software unit, and an inter-process communication or a call-function is used to communicate between the processes.

Figure 3:
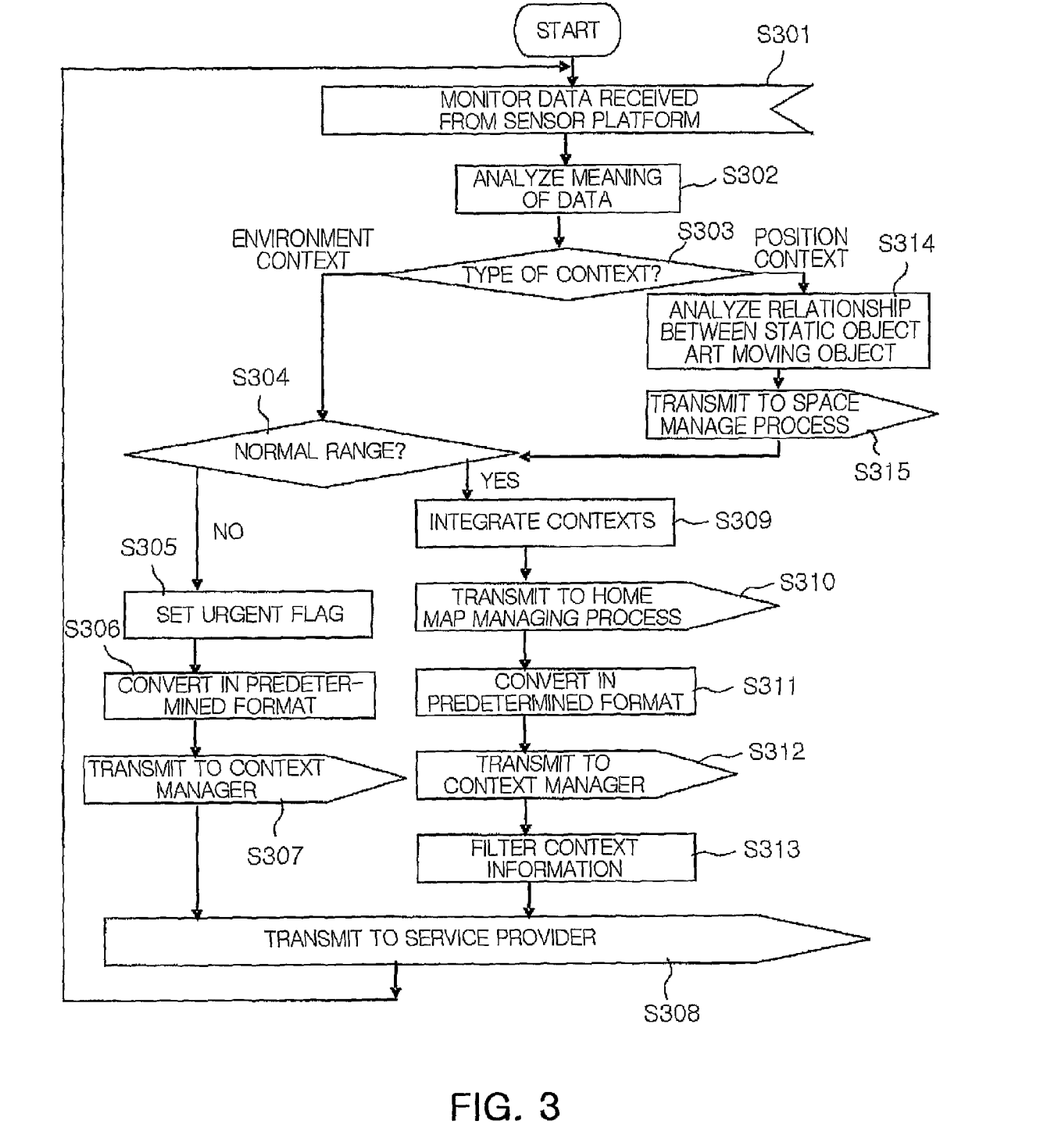
FIG. 3 is a flowchart showing a method of context awareness based on a sensor network in ubiquitous environment according to an embodiment of the present invention.

FIG. 3 is a flowchart showing a method of context awareness based on a sensor network in ubiquitous environment according to an embodiment of the present invention.

Referring to FIG. 3, data transmitted from the sensor platform 101 is observed in operation S301. Then, the meaning of the data is analyzed in operation S302, and the analyzed meaning is interpreted to context data which is a format of information to be viewable by a human and a computer. Herein, the data observed through the sensor platform 101 is a sensing data and the sensing data expresses contexts as temperature, voltage and coordinate. Such sensing data are only numerical values. The numerical values of the sensing data are transformed to the context data to be recognized by the human and the computer.

After transforming, a type of the context data is verified in operation S303. If the type of the context data is an environment context, it determines whether a value of corresponding context is in a normal range or not in operation S304.

If the value of corresponding context is out of the normal range in operation S304, an urgent flag is set in operation S305, the corresponding context data is transformed to a predetermined format in operation S306 and transmitted to the context manager 109 and the service provider 111 to store the context data in operation S307 and S308. The service provider provides a proper context-aware service in real time.

The predetermined format may be a message format exchanged between the context-aware agent and the context manager or between the context-aware agent and the computer program providing a service. Such a format may be modified or changed in various forms according to types of context transmitted from the sensors.

If the value of corresponding context data is in the normal range in operation S304, context data form various sensors are integrated in operation S309 and the integrated context is transmitted to the home map manager in operation S310 and the home map manager displays the integrated context data in a form of a graphic user interface (GUI).

After transforming to the predetermined format data in operation S311, it is transmitted to the context manager 109 in operation S312 and stored in the context storage 110.

The integrated context data is filtered in operation S313. If the integrated context data requires a predetermined service, the integrated context data is transmitted to the service provider 111 in operation S308 to automatically provide a corresponding service in real time.

If the type of the transformed context data is a position context in operation S303, the relationship between the static object and the moving object is analyzed in operation S314, the analyzing result is transmitted to the space manage process 204 in operation S315 to infer the intention of the moving object. In order to infer, three steps of inferring operation are performed as follows. The comparative states between the static object and the moving object are analyzed based on the analyzed position information and direction information. Then, a position relation between the moving object and the static object is defined based on a time. Finally, the intention of the moving object's movement is inferred based on rules made based on characteristics of the static object. Then, the inferred intention is transmitted to the service provider 111 in operation S308 to use the inferred intention for providing the related service.

The analyzed position context may require a service having a value out of the normal range, for example, a user enters a room and requires a service to turn on the light of the room. Then, an urgent flag is set in operation S305 and the context is transformed to a predetermined format in operation S306 and transmitted to the context manager and the service provider 111 in operation S307 and S308 to stored the corresponding context and the provide a corresponding service in real time.

The predetermined format may be a message format exchanged between the context-aware agent and the context manager or between the context-aware agent and the computer program providing a service. Such a format may be modified or changed in various forms according to types of context transmitted from the sensors.

If the three-dimension position context is in the normal range in operation S304, the contexts collected from the various sensors are integrated in operation S309, transmitted to the home map manager in operation S310 and displayed in a forma of graphic user interface (GUI) through the home map.

After transforming to the predetermined format in operation S311, it is transmitted to the context manager 109 to store it in the context storage 110.

The integrated context is filtered in operation S313. If the filtered context is a context requiring a predetermined service, it is transmitted to the service provider 111 in operation S308 to perform necessary operations to automatically provide a predetermined service in real time.

Figure 4:
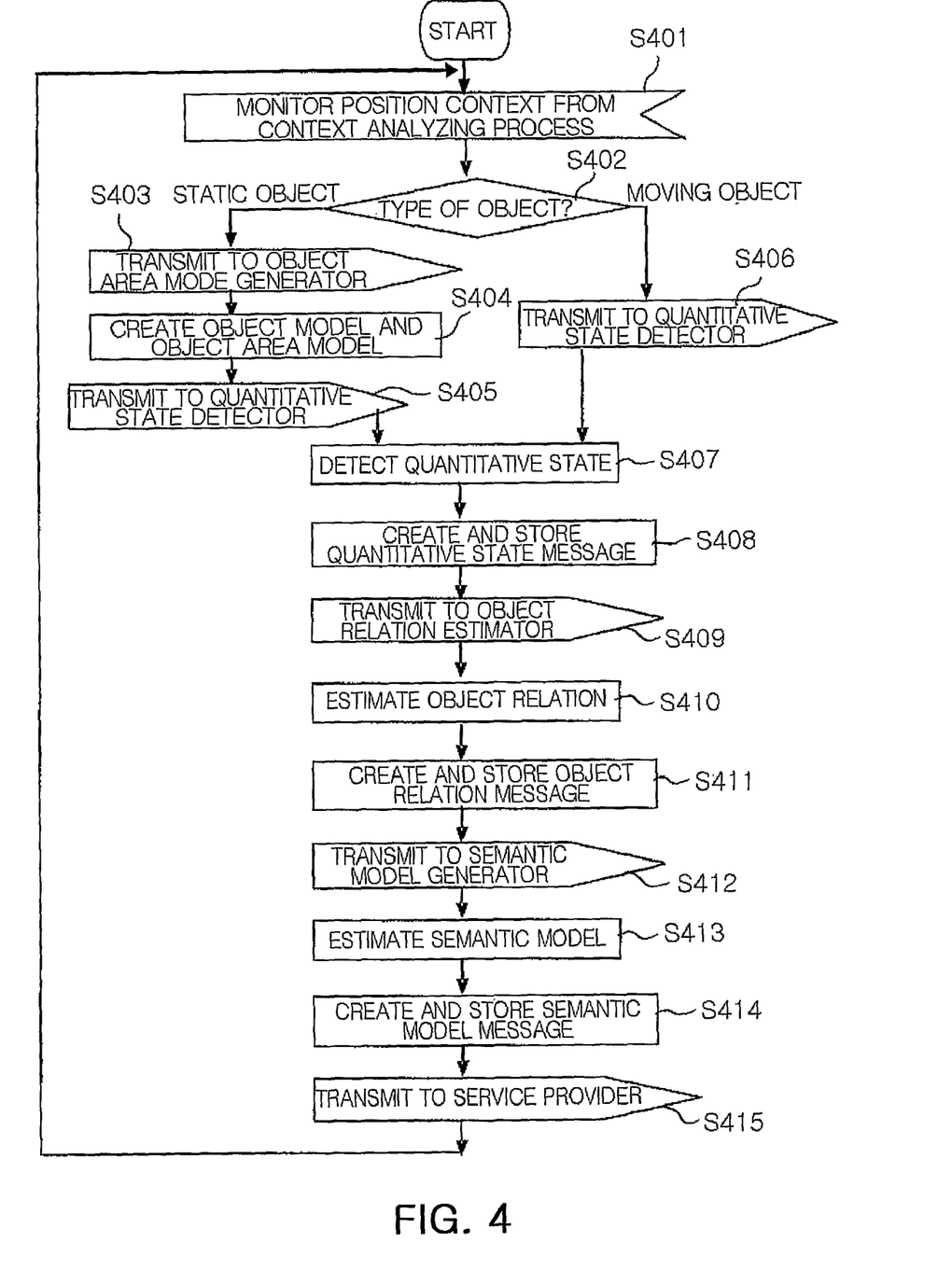
FIG. 4 is a flowchart of inferring an intention related to a position context performed in a space managing process in a method of context awareness using a ubiquitous context-aware agent based on as sensor network according to an embodiment of the present invention.

FIG. 4 is a flowchart of inferring an intention related to a position context performed in a space managing process in a method of context awareness using a ubiquitous context-aware agent based on as sensor network according to an embodiment of the present invention.

Referring to FIG. 4, contexts of the context analyzing process 203 is observed in real time in operation S401 and a type of the context is analyzed in operation S402.

If the type of the context is a static object in operation S402, the context is transmitted to an object model generator in operation S403 and the object model generator creates an object model and an object space model in operation S404. Herein, the object model generator creates the object model and the object area model with reference to information related to types and sizes of a real static object and a functional area of the static object which are previously stored. The object model expresses a position and a size of the sensed static object and the object space model expresses a position and a size of the functional area of the sensed static object.

The created object model and object space model are transmitted to a qualitative state detector in operation S405 and a qualitative state of the models are detected in operation S407.

If the type of the object is the moving object in operation S402, the context is transmitted to the qualitative state detector in operation S406 and the qualitative state of the context is detected in operation S407.

The qualitative state is detected by comparing the position information of a moving object transmitted in real time with reference to the object model and the object area model of the static object.

If the qualitative state between the moving object and the static object is changed, a predetermined format of the qualitative state message is created and the qualitative state message is stored in the context storage 110 in operation S408.

The created qualitative state message is transmitted to an object relation inferring unit for inferring the object relation in real time in operation S409. The object relation is inferred based on the qualitative states such as approach, reside and leave in operation S410. Then, the predetermined format of the relation message is created using position information such as on, front, rear, left and right, and the created relation message is stored in the storage in operation S411.

The object relation message is transmitted to a semantic model inferring unit in operation S412. The semantic model inferring unit infers a semantic model with reference to a semantic model knowledge base including rules previously defined based on the characteristics of the static object in operation S413. Accordingly, the service provider 111 generates the context data to provide meaningful context-aware services. Such a context is created as a predetermined format of a semantic model message and the created semantic model message is stored in the context storage 110 in operation S414.

The semantic model message is transmitted to the service provider 111 in operation S415. Therefore, the proper context-aware service may be provided to the user in real time. After providing the service, the semantic model message may be used as a data for self-learning.

Figure 5:
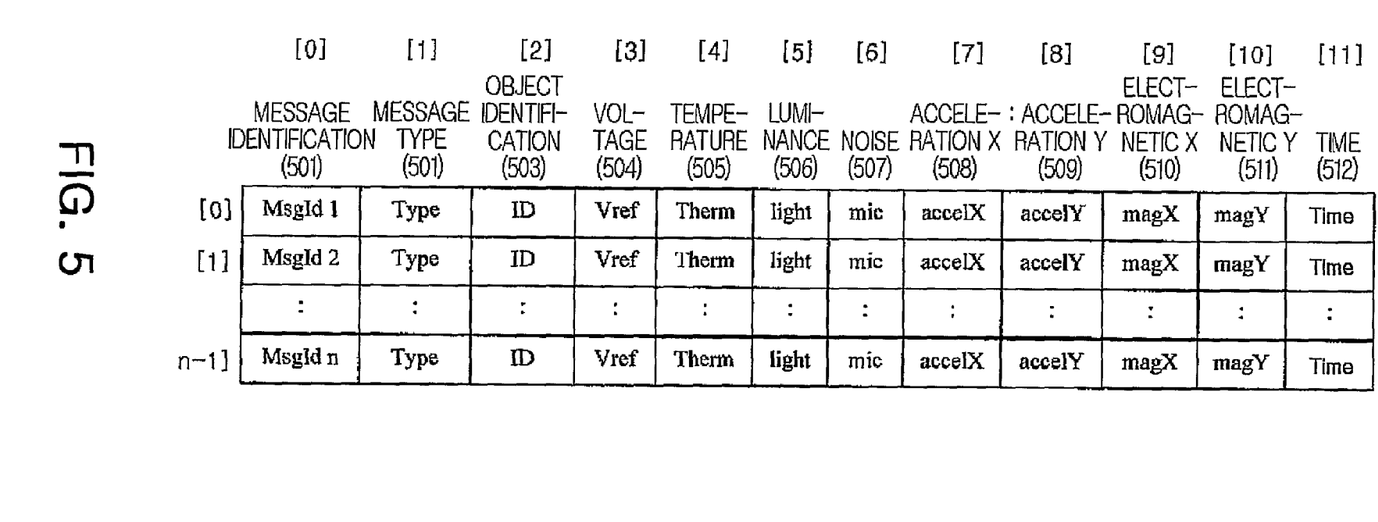
FIG. 5 shows a storage space for storing environment context data in an apparatus of a ubiquitous context-aware agent based on a sensor network according to an embodiment of the present invention.

FIG. 5 shows a storage space for storing environment context data in an apparatus of a ubiquitous context-aware agent based on a sensor network according to an embodiment of the present invention.

Referring to FIG. 5, the storage space for storing environment context data according to the present embodiment includes an environmental context storage space and an object context storage space. Such a context storage stores and manages context data according to a type of a context which is analyzed and integrated after received from the sensor platform.

The environmental context storage space stores items of the context such as a message identification 501, a message type 502, an object identification 503, a voltage 504, a temperature 505, a luminance 506, a sound 507, an acceleration X 508, an acceleration Y 509, an electromagnetic field X 510, an electromagnetic field Y 511 and a time 512. Other items may be added to the environment context storage space according to additional sensors.

Herein, the message identification 501 is a value identifying the messages itself by the class.

The message type 502 is used to classify the message into a response message or a request message. If it is the response message, the message type 502 denotes one of a normal message and an abnormal message. Therefore, the message type 502 makes the message to perform its dedicated function with the message identification 501.

The object identification 503 is a item for classifying the objects by it's type. The type of the object may be a human and an object, the human may be classified into a grandfather, a grandmother, a father, a mother, a son and a daughter. The object may be classified into furniture such as a drawer, a table or a sofa, and electronic appliance such as a TV, a refrigerator and a washer.

The environmental context data may be a voltage 504, a temperature 505, a luminance 506, a noise 507, an acceleration X 508, an acceleration Y 509, an electromagnetic field X 510 and an electromagnetic field Y 512. If additional sensors are added, more items for the environmental context will be added. Each of the environmental context data is transformed to a predetermined format of message to be viewable to a computer and a human, and stored and managed with the message identification 501, the message type 502 and the object identification 503. The stored and managed environmental context data is used to provide the context-aware service in real time.

Figure 6:
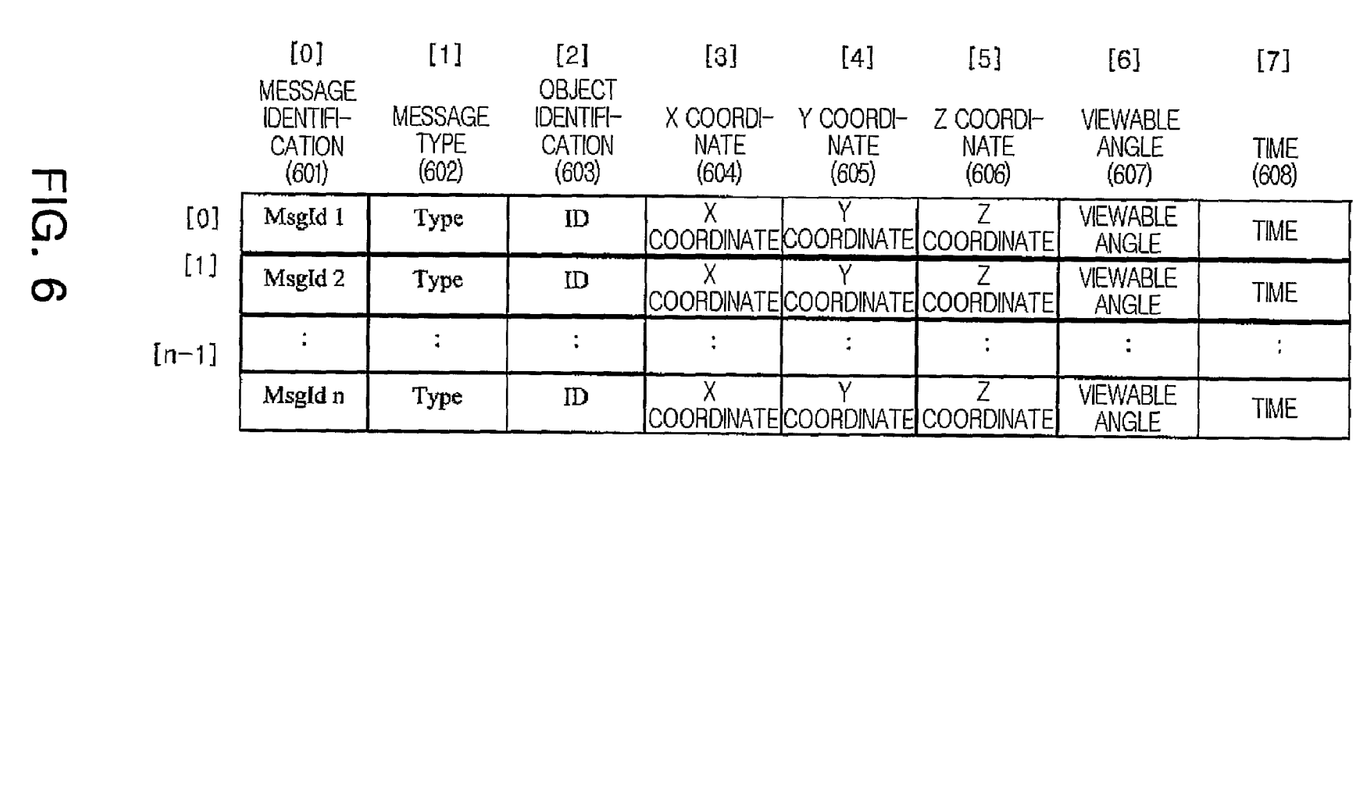
FIG. 6 shows a storage space for storing an object context in an apparatus of a ubiquitous context agent based on a sensor network according to an embodiment of the present invention.

FIG. 6 shows a storage space for storing an object context in an apparatus of a ubiquitous context agent based on a sensor network according to an embodiment of the present invention.

Referring to FIG. 6, the storage space for storing the object context is configured of a message identification 601, a message type 602, an object identification 603, a X coordinate 604, a Y coordinate 605, a Z coordinate 606, a viewable angle 607 and a time 608.

Herein, the message identification 601, the message type 602, the object identification 603 and the time 608 denote same information compared to those items for the environmental context storage space. The X coordinate 604, the Y coordinate 605 and the Z coordinate 606 denote a three-dimensional position coordinate generated by converting the position related data collected from the sensors. The viewable angle 607 denotes a direction to the object and is obtained from the position related data collected from the sensors.

The object context storage space stores and manages the position information of the object which is created according to the object identification.

Figure 7:
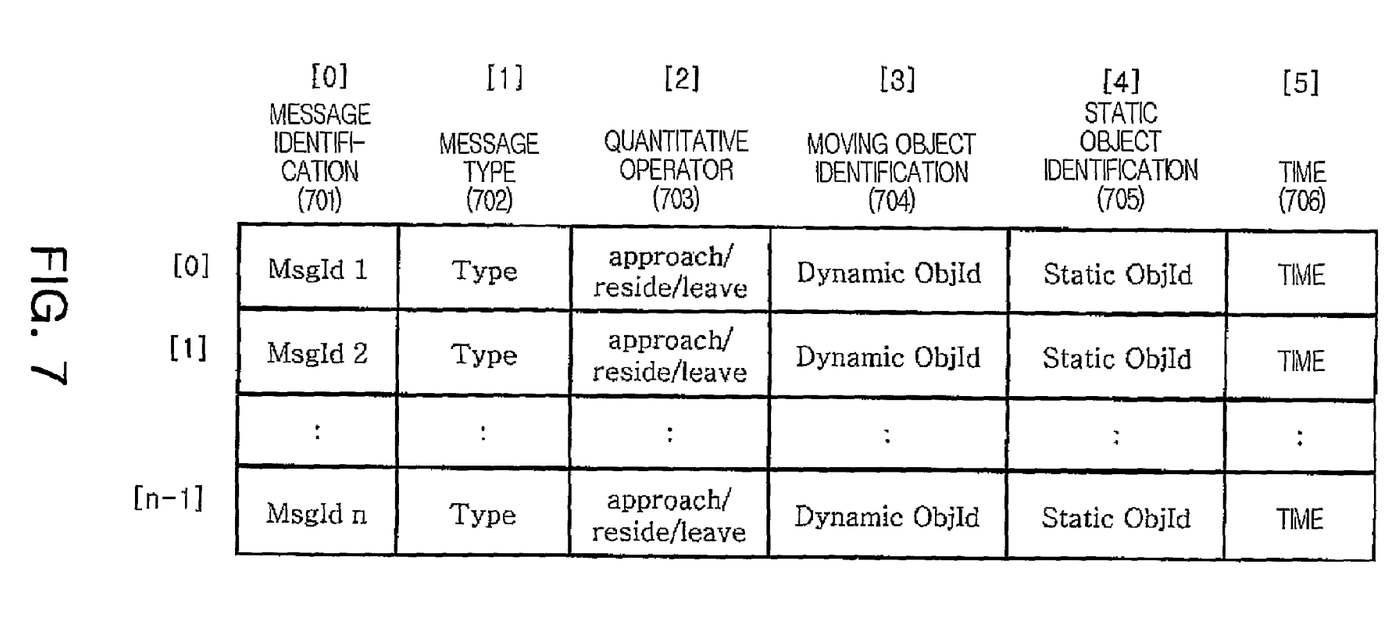
FIG. 7 shows a transmitting message in a qualitative state context-aware layer in a ubiquitous context agent based on a sensor network according to an embodiment of the present invention.

FIG. 7 shows a transmitting message in a qualitative state context-aware layer in a ubiquitous context agent based on a sensor network according to an embodiment of the present invention.

Referring to FIG. 7, the transmitting message includes information such as a message identification 701, a message type 702, a qualitative operator 703, a moving object identification 704, a static object identification 705 and a viewable angel 706.

Herein, the message identification 701 is a value for identifying a type of message transmitted, and the message type 702 is a value denoting the format of the message.

The qualitative operator 703 has one of values approach, reside and leave to express the qualitative relation between the objects.

The moving object identification 704 is a value identifying the moving object that is a target object of the detected qualitative state, and the static object identification 705 is a value for identifying the static object which is a target object of the detected qualitative state.

The time 706 denotes a time detecting the qualitative state of the moving object and the static object.

Figure 8:
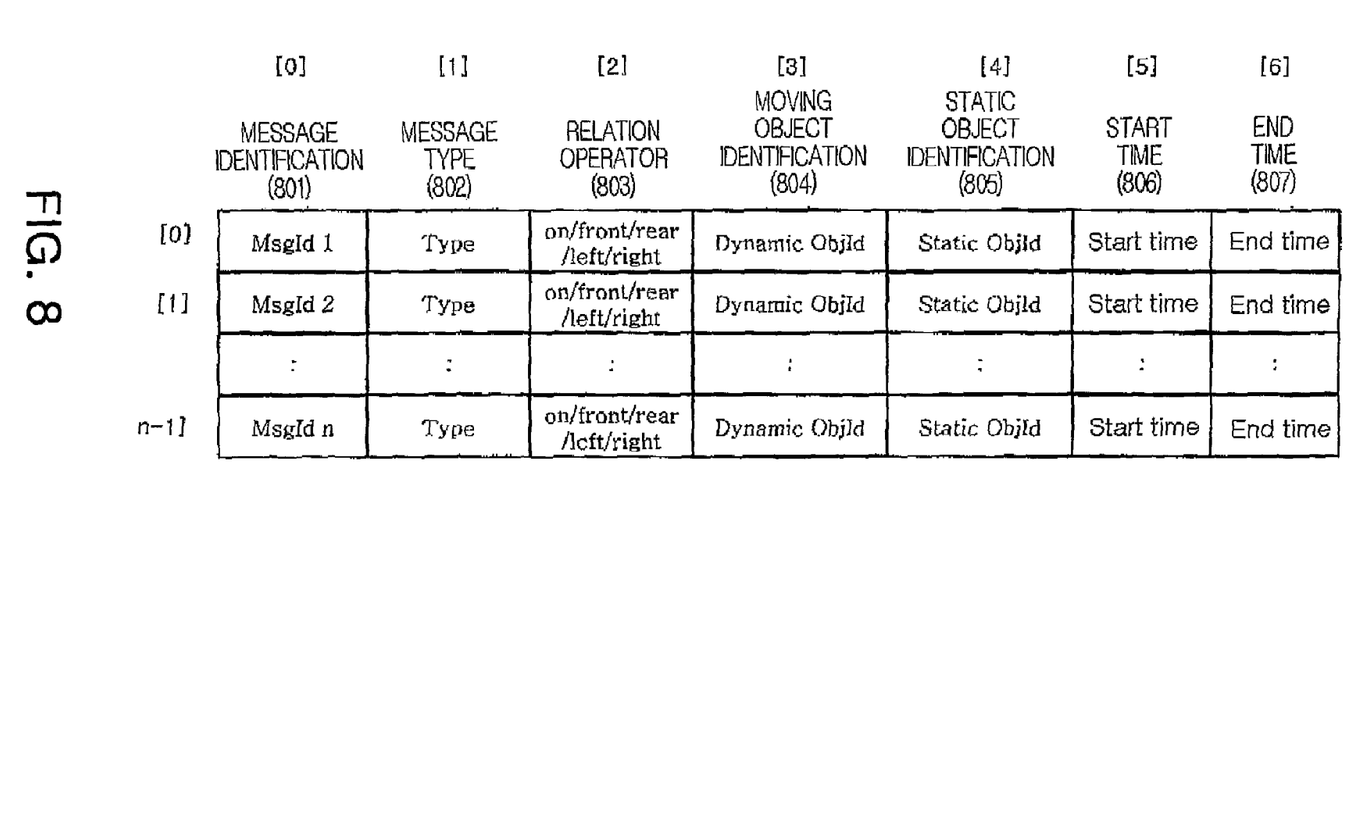
FIG. 8 shows a transmitting message in a layer of recognizing an object relation in a ubiquitous context agent based on a sensor network according to an embodiment of the present invention.

FIG. 8 shows a transmitting message in a layer of recognizing an object relation in a ubiquitous context agent based on a sensor network according to an embodiment of the present invention.

Referring to FIG. 8, the transmitting message includes a message identification 801, a message type 802, a relation operator 803, a moving object identification 804, a static object identification 805, a start time 806 and an end time 807.

The message identification 801 is a value for identifying the message to be transmitted, and the message type 802 is a value denoting the type of the message. The relation operator 803 is a value denoting a relation between the moving object and the static object for a predetermined time such as on, front, rear, left, and right.

The moving object identification 804 is a value to identify a moving object that is a target object of the detected object relation, and the static object identification 805 is a value to identify a static object that is a target object of the detected object relation.

The start time 806 includes time information denoting a time establishing a relation between the moving object and the static object, and the end time 807 includes time information denoting a time terminating the relation between the moving object and the static object.

The above described methods for ubiquitous context-aware based on the sensor network and for inferring a position context thereof according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk, an optical magnetic disk, and carrier waves such as data transmission through the Internet The computer-readable recording medium can also be distributed over network-coupled computer systems so that the computer-readable code is stored and executed in a distributed fashion. Also, functional programs, codes, and code segments for accomplishing the present invention can be easily construed by programmers skilled in the art to which the present invention pertains.

As described above, the apparatus and method for ubiquitous context-aware based on a sensor network allows the real-time service according to the object and the context thereof by analyzing and integrating real world data collected from the sensors.

Furthermore, the apparatus and method for ubiquitous context-awareness based on the sensor network allows a computer program to provide a context-aware service according to the users' intention and context by expressing the position and the direction information collected from the sensor in real time as the semantic context in a terminological logic format through hierarchical inference.

It will be apparent to those skilled in the art that various modifications and variations can be made in the present invention. Thus, it is intended that the present invention covers the modifications and variations of this invention provided they come within the scope of the appended claims and their equivalents.

The invention claimed is:

1. An apparatus of an ubiquitous context-aware agent based on a sensor network, the apparatus comprising: a sensor platform for collecting data of real world and transmitting the collected data to a context-aware agent; the context-aware agent for interpreting and integrating the data of real world from the sensor platform, and storing and managing context information according to the interpreted and integrated data; and a service provider for receiving the context information from the context-aware agent, and automatically performing operations according to the received context information, wherein the context-aware agent includes a context interpreter for receiving the collected data from the sensor platform and interpreting the received data to be viewable to a human and a computer; an integrator for receiving an interpreted context information from the context interpreter and integrating the received context information in a predetermined format; a space manager for receiving the interpreted context information from the context interpreter and detecting users' intention with reference to a relation between a users' movement and static objects in a predetermined space; a home map manager for receiving the interpreted context information from the context interpreter, and displaying current states of a real world to the user using the interpreted context information; a context storage for storing information transferred from the context integrator, the space manager and the home map manager, and outputting the stored information in response to a request; and a context manager for receiving the predetermined format of the integrated context information from the context integrator and managing the context information stored in the context storage.

2. The apparatus of claim 1, wherein the sensor platform includes: a sensor node for collecting the data of real world; and a sensor coordinator for transferring the collected data to the context-aware agent.

3. The apparatus of claim 1, wherein the context integrator transfers information related to a service context to the service provider.

4. The apparatus of claim 1, wherein the home map manager displays a ubiquitous space in a form of a graphic user interface (GUI), and the ubiquitous space is displayed to the user by adding, deleting and updating objects in the ubiquitous space according to the context.

5. The apparatus of claim 1, wherein the service provider receives information
related to a context requiring a service among the contexts from the context integrator, receives the context information from the context storage, infers users' intention through analyzing a relation between the interpreted context information and static objects, and providing an automated service according to the inferred intention.

6. The apparatus of claim 1, wherein the context integrator transfers the context information to the service provider when the context information interpreted at the context interpreter is an urgent message.

7. A method of context-awareness using an ubiquitous context-aware agent based on a sensor network comprising:
   detecting sensing-data related to a real world collected through a sensor platform, and transforming the sensing-data to context information by analyzing a meaning of the sensing-data;
   determining whether a value of the transformed context information is in a normal range or not if a type of the transformed context information is an environmental context;
   setting an urgent flag, storing corresponding context information and transferring the context information to a service provider if the value of the transformed context information is not in the normal range;
   integrating context information, storing corresponding context information, filtering the stored context information and transmitting the filtered context information to the service provider if the value of the transformed context information is in the normal range;
   analyzing a relation between a moving object and a static object if the type of the transformed context information is a position context, detecting an intentions of a user according to a position, and determining whether it's value is in a normal range or not; and
   integrating context information, storing corresponding context information, filtering the stored context information and providing the filtered context information to the service provider if the value is in the normal range.

8. The method of claim 7, wherein in the operation of the integrating, storing, filtering and transmitting, the context information is integrated and the integrated context information is displayed as a GUI (graphic user interface) format through a home map.

9. The method of claim 7, wherein in order to detect the users' intention in the operation of the analyzing, detecting and determining, a comparative state between the static object and the moving object is detected based on the analyzed position information and direction information, a position relation between the static object and the moving object is defined with reference to a time, and a meaning of the movement made by the moving object is inferred using rules made according to characteristics of the static object.

10. The method of claim 7, wherein in the operation of the integrating, storing, filtering and providing, the context information is integrated and the integrated context information is displayed in a GUI (graphic user interface) format through a home map.

11. The method of claim 7, further comprising setting an urgent flag, storing corresponding context information and providing the stored context information to the service provider if the value is not in the normal range in the operation of the analyzing m detecting and determining.

12. A method of inferring a position context in a context-aware method using an ubiquitous context-aware agent based on a sensor network, the method comprising:

determining a type of an object through monitoring context information in real time, and creating an object model and an object area model if the type of the object is a static object;

detecting a qualitative state if the type of the object is a moving object in the operation of the determining and creating or if the object model and the object area model are created in the operation of the determining and creating;

generating a qualitative state message based on the detected qualitative state and storing the generated qualitative state message;

generating an object relation message by inferring an object relation using the qualitative state message and storing the generated object relation message; and generating a semantic model using a stored object relation model, generating a semantic model message according to the generated semantic model and storing the semantic model message.

13. The method of claim 12, wherein in the operation of the determining and creating, the type of the object is determined by monitoring context information in real time, and if the type of the object is the static object, an object model and an object area model are created with reference to information related to a size of a real static object, and a type and a size of a functional area of the real static object, where the object model expresses the position and the size of the sensed static object and the object area model expresses the position and the size of the functional area of the sensed static object.

14. The method of claim 12, wherein in the operation of the detecting, the qualitative state is detected by comparing position information of the moving object transmitted in real time with reference to the object model and the object area model of the static model.

15. The method of claim 12, wherein in the operation of the generating an object relation message and storing the generated object relation message, a relation of the moving object and the static object is analyzed to determine whether the relation is which one of qualitative states approach, reside and leave, and the object relation message is created to have a predetermined format using one of a position relation information on, front, rear, left and right.

16. The method of claim 12, wherein in the operation of the generating a semantic model and generating a semantic model message, the semantic model is inferred with reference to a semantic model basic knowledge including previously-defined rules based on characteristics of the static object by receiving the object relation message, and the semantic model message with a predetermined format is created and stored.

17. The method of claim 16, wherein the semantic model message is transmitted a service provider to provide a service to a user in real time according to the semantic model message.

* * * * *